June 28, 1927. E. A. ARNDT Re. 16,665
AUTOMOBILE TRUNK
Original Filed Aug. 21, 1925
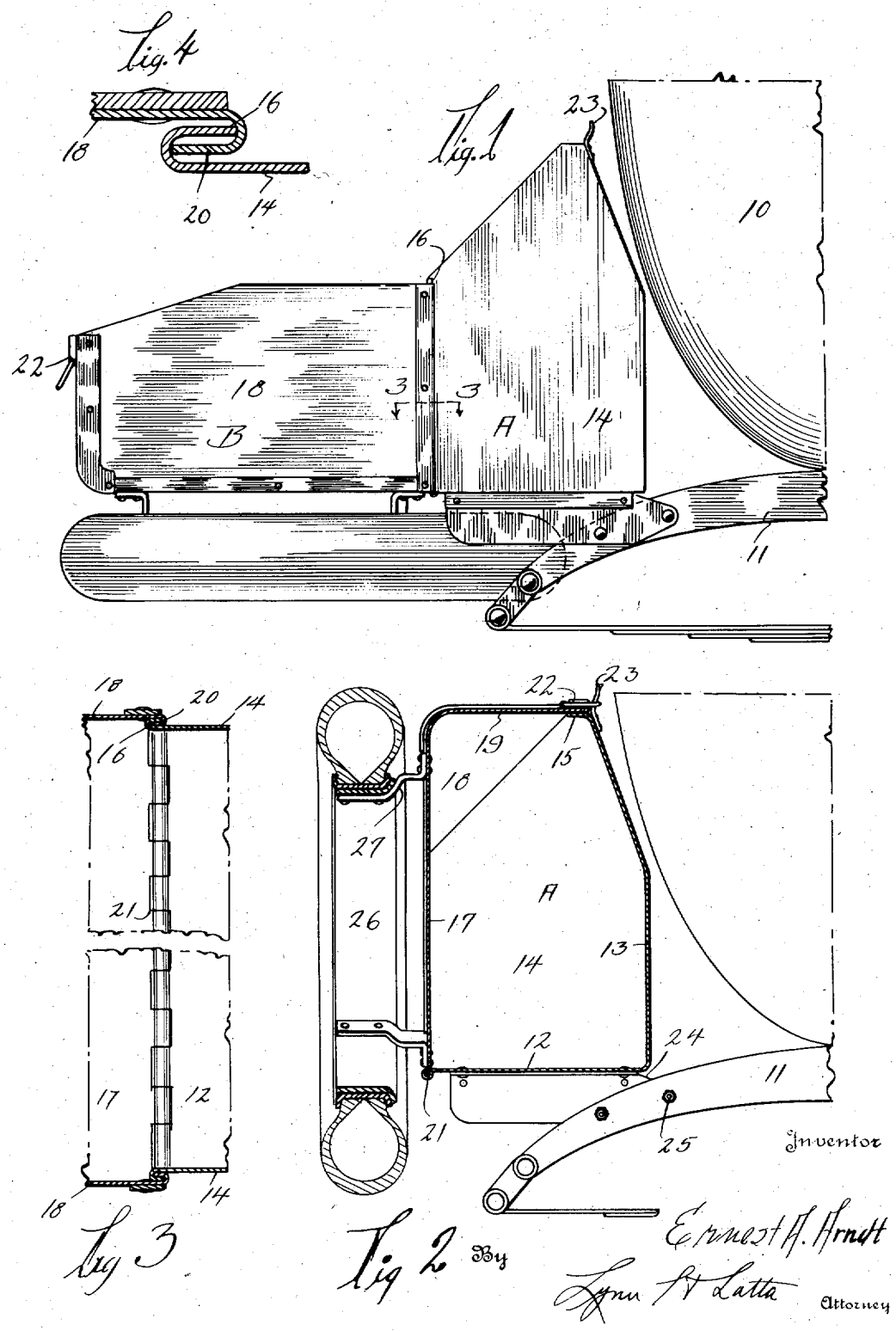

Reissued June 28, 1927. Re. 16,665

UNITED STATES PATENT OFFICE.

ERNEST A. ARNDT, OF SIOUX CITY, IOWA.

AUTOMOBILE TRUNK.

Original No. 1,594,235, dated July 27, 1926, Serial No. 51,621, filed August 21, 1925. Application for reissue filed May 26, 1927. Serial No. 194,269.

My invention relates generally to what are commonly known as automobile trunks and has for its primary object to provide a combined trunk for traveling purposes, luggage carrier for delivery purposes and spare tire carrier.

More particularly it is my purpose to arrange a spare tire carrier, in combination with an automobile trunk, so that the spare tire will not in any way interfere with the opening and closing of the trunk, the trunk being as convenient of access as though there were no tire present and conversely so that the trunk may not interfere in any way with the removal or replacement of the spare tire.

A further object of my invention is to provide a novel trunk and luggage carrier construction, in which the movable cover member of the trunk is provided with sides which overlap the fixed part of the trunk when the cover is closed and which serve to retain parcels or the like when the cover member is opened to serve the purpose of a luggage carrier, the end of the movable trunk member or cover which is next to the hinge being open and adjacent extremities of the sides being provided with elements adapted to engage coacting elements on the fixed trunk member for limiting the movement of the cover to a horizontal position and for supporting the weight of the articles carried thereby, said coacting elements being disposed between the telescoping sides of the respective cover and trunk member so as to be practically hidden at all times.

Another object of my invention is to so mount a tire carrier relative to the trunk that a tire which is very much larger than the area of the trunk may be carried thereby and yet will not interfere with the hinging action of the trunk cover.

A further object is to provide such a combined trunk, luggage carrier and tire carrier which is simple and inexpensive in construction, yet durable in operation.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of the rear portion of a vehicle to which my invention is attached and shown in open position.

Fig. 2 is a longitudinal, central, sectional view through the trunk and chassis of the vehicle, the body thereof being shown in elevation.

Fig. 3 is a horizontal, transverse, sectional view taken on the line 3—3 of Fig. 1.

Fig. 4 is an enlarged, detail, sectional view showing the coacting stop members.

I have used the reference character 10 to indicate generally the body of a vehicle having the longitudinal frame bars 11. Such parts as the gas tank of the vehicle and other members situated between these frame bars have not been illustrated, although it will be understood that ordinarily the frame bars project rearwardly a considerable distance beyond such appurtenances.

The trunk of my invention comprises generally a fixed trunk member A and a movable trunk member or cover B. The fixed trunk member A includes the bottom wall 12, forward wall 13, the side walls 14, and a top wall 15, which extends rearwardly a distance from the rearward wall 13, which is considerably less than the width of the bottom wall 12. It may now be noted that the side walls 14 are cut away on diagonal lines extending from the forward extremity of the upper wall 15 to a point which is substantially the same distance above the lower rear corner of the walls 14, as the forward corners are situated forwardly thereof, that is, the length of the perpendicular rear edges of the walls 14 is the same as the width of the bottom wall 12. These perpendicular edges are provided with outwardly turned channel flanges 16, shown in detail in Fig. 4, the flanges extending the entire length of their perpendicular edges. The cover or movable trunk member B comprises the rear or bottom wall 17, the side walls 18 and the outer wall 19.

It will now be seen that the fixed trunk member is open at its rear side and partially open above and that the movable trunk member or cover is entirely open both on one side and one end. The open side and end of the cover are adapted to receive the fixed trunk member A, the sides 18 embracing the trunk and being spaced closely adjacent thereto. The free end edges of the sides 18 are provided with reversely turned flanges 20, shown in Fig. 4, which normally slide in substantial contact with the sides 14 of the fixed trunk member and, which are hidden between the sides 14 and the sides 18. In the same way, it will be seen that the channel members 16 are constantly hidden between the sides 14 and the sides 18. When the cover member B is in the position shown in Fig. 1 the channels 16 and 20 will interlock, as shown in Fig. 4 and in Fig. 3, during their entire length. Thus movement of the cover member B downwardly beyond the horizontal position shown will be prevented and the cover member is thus supported so that articles of luggage may be placed therein as well as in the fixed member A. It may now be noted that, due to the cutting away of the upper wall and upper corner of the fixed trunk member, more space is provided for such articles as may be taller than the trunk member. For instance, milk cans may be carried in the device, their upper ends projecting above the wall 15. Where only one milk can could be carried by the cover member alone, the cutting away of the trunk member allows several to be carried. The wall 17 of the cover member is hinged at 21 to the lower wall 12 of the stationary trunk member. Thus the cover member may be hinged upwardly from the position shown in Fig. 1 to the position shown in Fig. 2, in which the wall 17 contacts with the forward, vertical edges of the sides 14 and the end wall 19 covers the upper wall 15 of the fixed trunk member. In this position, the coacting hasp devices 22 and 23 on the cover and fixed trunk member, respectively, are adapted to be secured together for locking the cover in place.

The fixed trunk member is permanently secured to the frame of the vehicle by means of extensions or brackets 24 projecting downwardly from the bottom of the trunk and bolted, as at 25, to the frame bars 11. It may now be noted that the trunk is carried in a position directly adjacent a rear wall of the body 10 where the spare tire of the vehicle is ordinarily carried.

The problem involved in thus attaching a trunk to the rear of a vehicle has been to dispose of the spare tire in such a way that convenient access might be had to both the tire and the trunk. Previous to my invention, it has been customary to utilize the trunk opening only at the top and to provide extensions from the frame of the vehicle extending around and behind the trunk to a position where they might support the tire rearwardly of the trunk. Thus the tire carrier was permanently disposed behind the trunk and access to the trunk could be had only from the top. It will be impossible to utilize such a trunk as a combined trunk and luggage carrier and it has always been found inconvenient to obtain access to the trunk even in the limited manner mentioned, for the reason that the person must reach over the spare tire, subjecting his clothes to probable contact with the tire and necessitating undue exertion in lifting articles from the trunk. In order to overcome the objection to building additional extensions for supporting the spare tire rearwardly of the old type of trunk, I have conceived the possibility of attaching the tire directly to the trunk itself. This, however, would not in itself entirely eliminate the objections to the old method of attaching a trunk to a vehicle. The presence of the tire when the trunk is to be opened, has constituted the most undesirable feature of the old arrangement. It has therefore occurred to me that by attaching the tire to the cover of the trunk itself and by properly arranging that cover, the tire could be swung to a position where it would not interfere with the access to the trunk and co-incidentally the trunk would be opened to display the contents thereof. In order to carry out this broad idea, I have located the hinge at the lower, outer corner of the trunk instead of at the upper, outer corner, as in the ordinary trunk. Thus the cover member normally constitutes the rear wall of the trunk and the tire may accordingly be mounted directly on this rear wall against the face of the cover so as to be disposed in a normal, vertical position, the same as the position of the ordinary spare tire carrier wherein it may be readily reached for removal. Upon opening the cover, it swings downwardly to a horizontal position and the tire swings underneath so as to be completely hidden beneath the cover. The tire carrier is indicated at 26 in Fig. 2 and includes the brackets 27 by which it is attached to the wall 17 of the cover member. Any conventional type of tire carrier may be employed and a particular construction thereof does not form a part of my invention.

It may be noted that the carrier is so arranged that the tire, when attached, will be substantially flush with the outer wall 19 of the cover and will project substantially beyond the hinge 21 at its other side. The distance between the brackets 24 is sufficient to receive this projecting portion of the tire and the space below the trunk is left open and unobstructed so that as the cover is swung downwardly the projecting portion of the tire may swing between the brackets and between the frame bars 11, as shown in Fig. 10. As has already been mentioned, the gas tank of the ordinary car does not project rearwardly as far as the frame members and consequently there will be sufficient space for the tire to project forwardly, as far as is shown in Fig. 1. Thus by allowing the tire to project beyond the hinge of a trunk in which the hinge is situated at a corner and leaving an unobstructed space below the hinge and the bottom of the trunk, a tire which is considerably larger in dimensions than the area of the trunk may be secured thereto in such a manner as to completely disappear beneath the trunk when the cover is hinged downwardly.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A trunk of the class described, comprising a fixed trunk member, open at the rear and adapted to be rigidly secured to the rear portion of a vehicle, a movable trunk member adapted to move relative to the fixed trunk member, to disclose the contents thereof, to a substantially horizontal position serving, in conjunction with the fixed trunk member, as a luggage carrier in that position, and a spare tire carrier secured to the movable trunk member and movable therewith.

2. A trunk of the class described, comprising a fixed trunk member, open at the rear and adapted to be rigidly secured to the rear portion of a vehicle, a movable trunk member adapted to move relative to the fixed trunk member, to disclose the contents thereof, to a position substantially horizontal, and serving, in conjunction with the fixed trunk member, as a luggage carrier in that position, and a spare tire carrier secured to the movable trunk member in a vertical position and movable therewith to a position removed from its original position near the fixed trunk member.

3. A trunk of the class described, comprising a fixed trunk member, open at its rear and adapted to be rigidly secured to the rear portion of a vehicle, a movable trunk member hinged to the lower rear corner of the fixed trunk member, adapted to swing from a substantially vertical, closed position, to a substantially horizontal position serving, in conjunction with the fixed trunk member, to carry luggage while in that position, and a spare tire carrier secured to the movable trunk member, positioned therebehind when the latter is in closed position, and substantially concealed therebeneath when the same is in open position.

4. A trunk of the class described, comprising a fixed trunk member having an opening and adapted to be rigidly secured to the rear portion of a vehicle, a movable trunk member having a wall to cover said opening, and having side walls embracing the fixed trunk member when the movable trunk member is in closed position, coacting elements on the fixed and movable trunk members, respectively, adapted to engage when the latter is in a horizontal position, and a spare tire carrier secured to the movable trunk member, positioned therebehind when the latter is in closed position, and substantially concealed thereunder when the latter is in open position.

5. A trunk of the class described, comprising a fixed trunk member having an opening and adapted to be rigidly secured to the rear portion of a vehicle, a movable trunk member having a wall to cover said opening, and having side walls embracing the fixed trunk member when the movable trunk member is in closed position, coacting elements on the fixed trunk member and on the side walls of the movable trunk member, substantially concealed between said side walls and the fixed trunk member, and adapted to engage when the movable trunk member is in horizontal position, and a spare tire carrier secured to the movable trunk member, positioned therebehind when the latter is in closed position, and substantially concealed thereunder when the latter is in open position.

6. A combined trunk and luggage carrier comprising a fixed trunk member adapted to be rigidly secured to the rear portion of a vehicle, said fixed trunk member being open at the rear and partially open at the top, a movable trunk member having a bottom wall to cover said rear opening, an outer wall to cover said top opening, and side walls adapted to closely overlap the side walls of the fixed trunk member, when the movable trunk member is in closed position, the movable trunk member being hinged to the lower rear corner of the fixed trunk member and adapted to move to horizontal position where the outer and side walls project upwardly to form a continuation of the side walls of the fixed member for retaining luggage.

7. A combined trunk and luggage carrier comprising a fixed trunk member adapted to be rigidly secured to the rear portion of a vehicle, said fixed trunk member being open at the rear and partially open at the top, a movable trunk member having a bottom wall to cover said rear opening, an outer wall to cover the said top opening, and side walls adapted to closely overlap the side walls of the fixed trunk member, when the movable trunk member is in closed position, the movable trunk member being hinged to the lower rear corner of the fixed trunk member, and coacting means on the side walls of the fixed and movable trunk member, respectively adapted to engage when the latter is in a horizontal position, to retain the same against movement below said horizontal position.

8. A combined trunk and luggage carrier comprising a fixed trunk member adapted to be rigidly secured to the rear portion of a vehicle, said fixed trunk member being open at the rear and partially open at the top, a movable trunk member having a bottom wall to cover said rear opening, an outer wall to cover the said top opening, and side walls adapted to closely overlap the side walls of the fixed trunk member, when the movable trunk member is in closed position, the movable trunk member being hinged to the lower rear corner of the fixed trunk member and coacting means on the side walls of the fixed and movable trunk member, respectively concealed between the adjacent side walls and adapted to engage when the latter is in a horizontal position, to retain the same against movement below said horizontal position.

9. A combined trunk and luggage carrier comprising a fixed trunk member adapted to be rigidly secured to the rear portion of a vehicle, said fixed trunk member being open at the rear and partially open at the top, a movable trunk member having a bottom wall to cover said rear opening, an outer wall to cover the said top opening, and side walls adapted to closely overlap the side walls of the fixed trunk member, when the movable trunk member is in closed position, the movable trunk member being hinged to the lower rear corner of the fixed trunk member and coacting elements on the rear and end edges of the side walls of the fixed and movable trunk member, respectively, said coacting elements extending toward each other between the side walls and being adapted to engage when the movable trunk member is in a horizontal position, for retaining the same against movement below said position.

10. A combined trunk and luggage carrier comprising a fixed trunk member adapted to be rigidly secured to the rear portion of a vehicle, said fixed trunk member being open at the rear, a movable trunk member having a bottom wall to cover said rear opening, and having side walls adapted to closely overlap the side walls of the fixed trunk member when the movable trunk member is in closed position, the movable trunk member being hinged to the lower rear corner of the fixed trunk member and adapted to move to horizontal position where the side walls project upwardly to form continuations of the side walls of the fixed trunk member for retaining luggage, and coating elements on the rear and end edges of the side walls of the fixed and movable trunk members, respectively, adapted to engage when the latter is in horizontal position.

11. A combined trunk and luggage carrier, comprising a fixed trunk member adapted to be rigidly secured to the rear portion of a vehicle, said fixed trunk member being open at the rear, a movable trunk member having a bottom wall to cover the said rear opening, and having side walls adapted to closely overlap the side walls of the fixed trunk member, when the movable trunk member is in closed position, the movable trunk member being hinged to the lower rear corner of the fixed trunk member and adapted to move to horizontal position where its side walls project upwardly to form continuations of the side walls of the fixed trunk member for retaining luggage.

12. A combined trunk and luggage carrier, comprising a fixed trunk member adapted to be rigidly secured to the rear portion of a vehicle, said fixed trunk member being open at the rear, a movable trunk member hinged to the fixed trunk member at its lower rear corner, and adapted to cover said opening when in closed position, and to swing downwardly to a substantially horizontal position to serve as a luggage carrier, and a spare tire carrier secured to said movable trunk carrier and located so as to carry a tire with a portion thereof extending beyond the hinge, the carrier being positioned behind the movable trunk member when the latter is in a horizontal position, and substantially concealed thereunder when the same is in horizontal position, the space below the trunk fixed member being unobstructed to receive the protruding portion of the tire.

13. A combined trunk and luggage carrier comprising a fixed trunk member adapted to be rigidly secured to the rear portion of a vehicle, said fixed trunk member being open at the rear, a movable trunk member hinged to the lower rear corner of the fixed trunk member and having a bottom wall to cover the said opening, and side walls adapted to closely overlap the side walls of the fixed trunk member when the movable trunk member is in closed position, the movable trunk member being adapted to move to substantially horizontal position where its side walls project upwardly to form continuations of the side walls of the fixed trunk member for retaining luggage, and coacting elements on the side walls of the fixed and movable trunk members respectively, adapted to engage when the latter is in horizontal position.

14. A combined trunk and luggage carrier comprising a fixed trunk member adapted to be rigidly secured to the rear portion of a vehicle, said fixed trunk member having an opening at the rear, a movable trunk member having a bottom wall to cover said rear opening, and having side walls adapted to closely overlap the side walls of the fixed trunk member, when the movable trunk member is in closed position, the movable trunk member being hinged to the lower rear corner of the fixed trunk member and adapted to move to substantially horizontal position where the side walls project upwardly to form continuations of the side walls of the fixed trunk member for retaining luggage, and coacting elements on the side walls of the fixed and movable trunk members, respectively, adapted to engage when the latter is in horizontal position, said coacting elements extending toward each other between the side walls and being substantially concealed therebetween.

15. A combined trunk and luggage carrier, comprising a fixed trunk member adapted to be secured rigidly to the rear portion of a vehicle, said fixed trunk member having an opening at the rear, a movable trunk member having a bottom wall to cover said rear opening, and having side walls adapted to closely overlap the side walls of the fixed trunk member when the movable trunk member is in closed position, the movable trunk member being hinged to the lower rear corner of the fixed trunk member and adapted to move to a substantially horizontal position serving as a luggage carrier, and coacting channels formed at the rear and end edges of the side walls of the fixed and movable trunk members, respectively, adapted to interlock when the latter is in horizontal position.

Signed at Sioux City, Iowa, this 20th day of May, 1927.

ERNEST A. ARNDT.